Oct. 21, 1958  S. E. CARLSON  2,856,889
MANUALLY OPERABLE PNEUMATIC SIGNAL
Filed Feb. 6, 1956
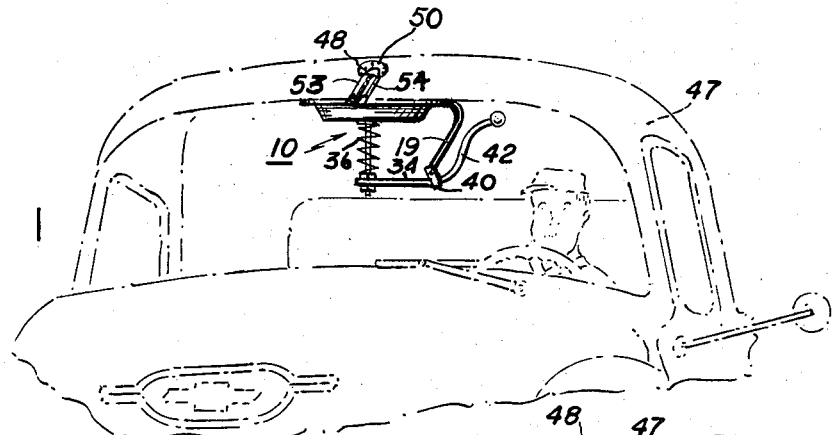
FIG. 1
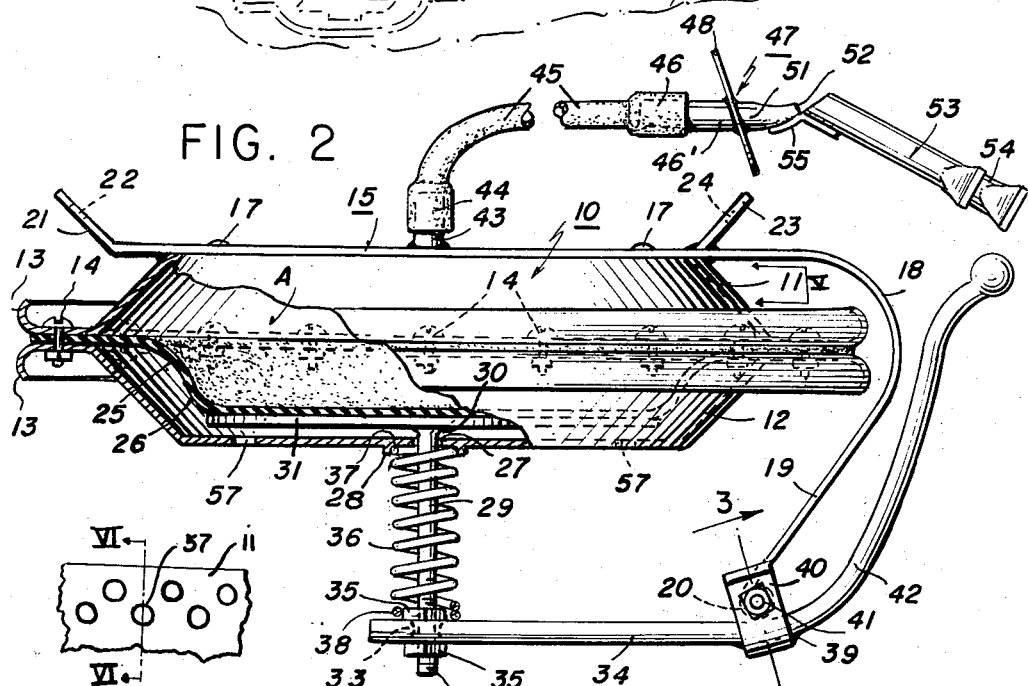
FIG. 2
FIG. 5
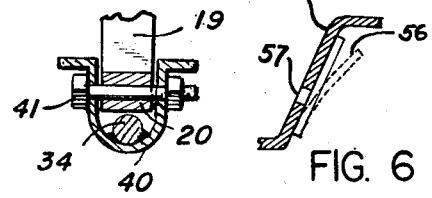
FIG. 3
FIG. 6
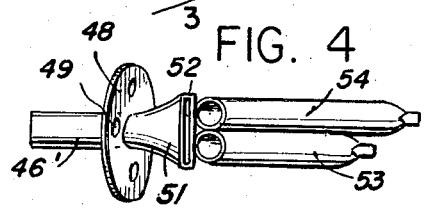
FIG. 4
INVENTOR
SAMUEL E. CARLSON
BY  R. W. Hodgson United States Patent Office 2,856,889
Patented Oct. 21, 1958

2,856,889

MANUALLY OPERABLE PNEUMATIC SIGNAL

Samuel E. Carlson, Alhambra, Calif.

Application February 6, 1956, Serial No. 563,668

1 Claim. (Cl. 116—139)

The present invention relates to a manually operated pneumatic signal, one that is adapted for use on vehicles such as bakery, ice cream and other types from which are dispensed foods and the like.

It is an object of the present invention to provide a pneumatic signal so constructed that the mechanism for producing air for a whistle may be mounted in a vehicle within easy reach of a driver, either underneath the dashboard, or as shown in Figure 1 of the drawing.

Another object of the present invention is the provision of mounting the whistle outside of a vehicle in a suitable place.

A still further object of the present invention is the provision of a whistle that will attract the attention of the public interested in purchasing goods from a vehicle so equipped.

The novel structural features of my device, its application and the many advantages therein will be more readily understood by persons familiar with the art, by reference to the following detailed description when taken in conjunction with the accompanying drawing wherein I have illustrated a practical and workable embodiment of the invention and I would have it understood that changes may be made in details without departing from the spirit and scope of the claim hereto appended.

Figure 1 illustrates the device mounted in a vehicle, the vehicle being shown in dotted lines.

Figure 2 is a side elevational view of the device parts being broken and in section.

Figure 3 is a sectional view taken on line 3—3 of Figure 2.

Figure 4 is a top plan view of the whistle.

Figure 5 is a fragmentary elevational view taken in the direction of the arrows indicated by the V in Figure 2 and is intended to show the exterior of multiple air inlet holes into the interior of the air chamber A; and Figure 6 is a fragmentary sectional view taken in the direction of the arrows VI—VI in Figure 5 and shows an inner rubber sealing flap in effective aperture closing and sealing relationship in solid lines, and shows said rubber sealing flap in aperture-open, air-ingress relationship in broken lines.

Referring to the drawing the numeral 10, represents the device and it comprises plates 11 and 12, the edges 13 being rolled or curved, the plates being secured together by bolts or rivets 14. Plate 11 is secured to the horizontal portion 15 of a securing strap 16 by rivets 17, a portion of the strap being bent or curved at 18 providing a depending portion 19, the end 20 being curled into circular configuration. The end 21 of the strap is bent upward and it is provided with an aperture 22, and adjacent the curved portion 18 there is spot welded or otherwise secured an angularly disposed securing lug 23 that is provided with an aperture 24.

Interposed between the plates 11 and 12 and secured by bolts 14 is a resilient diaphragm 25 having a depressed portion 26, the diaphragm forming an air chamber A in plate 11. Centrally of plate 12 is an aperture 27 that is encompassed by a circular flange 28 on the outer face of plate 12. The aperture 27 receives a shaft 29 that is freely movable therein, the end 30 of the shaft being provided with a disc 31 that engages the depressed portion 26 of the diaphragm for a purpose to be later described. The opposite end 32 of shaft 29 is threaded and it engages aperture 33 in rod 34 and it is securely fastened to the rod by lock nuts 35. Encompassing shaft 29 and interposed between plate 12 and rod 34 is a spring 36, one end 37 seats in the circular flange 28, the opposite end 38 encompassing one of the lock nuts 35 and seated on the rod 34. To rod 34 at 39 there is secured by spot welding a clevis 40, having apertures that receive a bolt 41 that passes through the end 20 to pivotally connect the depending portion 19 of strap 18 to the clevis. Rod 34 is bent upwardly and forms a handle 42.

Plate 11 is provided with an outlet tube 43 that receives one end 44 of a flexible conduit 45, the opposite end 46 being connected to the tube portion 46' of whistle 47. The whistle is provided with a flange 48 having apertures 49 that receive screws 50 for securing the whistle to a suitable part of the vehicle. The tube portion 51 of the whistle is flattened to form an elongated opening 52. Sound pipes 53 and 54 are secured to the tube portion 51 by plate 55 by soldering or spot welding. The ends of the sound tubes 53 and 54 are pinched to form closed ends for the tubes. It is to be noted that sound tube 54 is longer than tube 53 to give the whistle a two tone synchronized sound.

The device is mounted on the inside of a vehicle in any suitable place, under the dash board or instrument panel, or as shown in Figure 1 above the windshield. The strap 16 is secured to a suitable support by screws or bolts that engage apertures 22 and 24 of lugs 21 and 23 to rigidly support the device. The tube 46' of the whistle passes through an aperture in the roof of the vehicle or it may pass through an aperture in the fixed hood portion of a vehicle and is held in place by screws 50 that secure the flange 48 to the roof or fixed hood. Due to this mounting the sound tubes 53 and 54 are on the outside of the vehicle, the tube 46' being connected to tube 43 by a flexible conduit 45.

In operation of the device, the driver of a vehicle equipped with the present invention, to attract customers, simply pulls down on handle 42, rod 34 moves upwardly due to the pivotal connection of clevis 40 to the strap portion 19. During upward movement of rod 34, shaft 29 is also moved upwardly, which also moves plate 31 upwardly which upwardly moves the depressed portion 26 of diaphragm 25 forcing air that is entrapped in chamber A into outlet tube 43 through the flexible conduit 45, through the flattened portion 51 and out of the elongated opening 52 where the air engages the openings of sound pipes 53 and 54 producing a two tone sound. The spring 29 having been compressed during upward movement of the rod 34 and shaft 29, returns the handle and shaft 29 to normal position. The plate 12 is provided with multiple apertures 57 which are adapted to allow air to enter the space below the depressed portion 26 of the diaphragm 25 during upward movement of said diaphragm, said multiple apertures 57 being also adapted to allow egress of air downwardly therethrough when said diaphragm, the disc 31, the shaft 29 and the rod 34 are returned to their normal positions under the biasing action of spring 36. It should be noted that during the upstroke of the diaphragm 26, a rubber sealing flap 56 (best seen in Figure 6) lies across the inner face of the conical or tapered portion of the upper plate 11 at that portion thereof only which has the multiple apertures 57 therein, whereby to effectively seal said multiple apertures 57 during the upstroke of the diaphragm 26.

Said position of the rubber sealing flap 56 is shown in solid lines in Figure 6. However during the down stroke of the diaphragm 26, the upper free end of the rubber sealing flap 56 (the lower end being affixed to the inner side of the conical portion of the member 11) is caused to flex inwardly into the position shown in broken lines, thus allowing rapid ingress of air into the chamber A during said down stroke of the diaphragm 26.

Numerous modifications and variations of the present invention will occur to those skilled in the art after a careful study hereof. All such, properly within the basic spirit and scope of the present invention are intended to be included and comprehended herein as fully as if specifically described, illustrated and claimed herein.

The exact compositions, configurations, constructions, relative positionings, and cooperative relationships of the various component parts of the present invention are not critical, and can be modified substantially within the spirit of the present invention.

The embodiment of the present invention specifically described and illustrated herein is exemplary only, and is not intended to limit the scope of the present invention, which is to be interpreted in the light of the prior art and the appended claim only, with due consideration for the doctrine of equivalents.

I claim:

A manually operable pneumatic signal, comprising: a first effectively concave plate having an effectively concave inner surface; a second effectively concave plate having an effectively concave inner surface and having a central aperture through said plate; said first and second effectively concave plates being joined together with their effectively concave inner surfaces directed toward each other, a securing strap fixedly secured to one of said plates, said securing strap being provided with fastening means cooperable for engagement with the body of a vehicle for mounting said joined plates, a resilient diaphragm interposed between said plates, said joined plates and interposed diaphragm being peripherally secured together by bolt means, said diaphragm having a depressed portion normally positioned immediately adjacent the effectively concave inner surface of said second plate and defining an air chamber between said diaphragm and the effectively concave inner surface of said first plate; whistle means having an inlet port physically connected to the said first plate and in communication with said air chamber, said whistle having an outlet communicating with ambient atmosphere; connecting means including an inner disc positioned between said effectively concave inner surface of said second plate and said depressed portion of said diaphragm and including a connecting rod having an exterior end positioned outside of said second plate and having an intermediate portion interconnecting said inner disc and said exterior portion of said connecting rod and slidably extending through the central aperture in said second plate; a manually actuatable lever handle having an operating end and a manually graspable end, said handle being pivotally connected intermediate its ends to said securing strap for pivotal movement of said operating end toward and away from the outside of said second plate, said operating end of said handle being connected to the exterior end of said connecting rod; and coil compression spring biasing means encircling said connecting rod and having a first end abutting the outside of said second plate immediately around said central aperture therein and having a second end effectively abutting the operating end of said manually actuatable lever handle means and the exterior end of said connecting rod pivotally fastened thereto, said coil compression spring normally relatively biasing said manually actuatable lever handle and said diaphragm connected thereto by said connecting rod into inoperative position with the depressed portion of said diaphragm lying in a position immediately adjacent to said effectively concave inner surface of said second plate and maximizing the volume of air in said air chamber; said second plate being provided with vent means communicating the effectively concave inner surface of said second plate with ambient atmosphere; said first plate being provided with valve means communicating said air chamber with ambient atmosphere; said valve means closing during manually caused movement of said normally depressed portion of said diaphragm toward said first plate and opening during biasing-spring-caused return movement of said normally depressed portion of said diaphragm toward its normal position closely adjacent said effectively concave inner surface of said second plate.

References Cited in the file of this patent

UNITED STATES PATENTS

| 546,163 | King et al. | Sept. 10, 1895 |
| 2,608,784 | Lando | Sept. 2, 1952 |

FOREIGN PATENTS

| 20,408 | Great Britain | 1889 |
| 16,642 | Great Britain | of 1913 |